United States Patent
Bestenreiner et al.

[11] 3,775,110
[45] Nov. 27, 1973

[54] METHOD FOR THE PRODUCTION OF LENTICULAR ELEMENTS

[75] Inventors: Friedrich Bestenreiner, Grunwald b. Munchen; Reinhold Deml, Munchen, both of Germany

[73] Assignee: AGFA Gevaert Aktiengesellschaft, Leverkusen, Germany

[22] Filed: June 3, 1969

[21] Appl. No.: 830,073

[30] Foreign Application Priority Data
June 11, 1968 Germany.................. P 17 72 567.6

[52] U.S. Cl...................... 96/27 R, 96/81, 96/27 H, 350/178
[51] Int. Cl................................................ G03c 5/04
[58] Field of Search .................. 96/27, 26, 118, 45, 96/81

[56] References Cited
UNITED STATES PATENTS

| | | | |
|---|---|---|---|
| 3,586,412 | 6/1971 | Leith | 96/27 H |
| 3,284,208 | 11/1966 | Land | 96/118 |
| 3,504,970 | 4/1970 | Lindin | 96/26 |
| 3,110,593 | 11/1963 | Yule | 96/45 |
| 2,763,551 | 9/1956 | Smith | 96/26 |

OTHER PUBLICATIONS

G. T. Sincebox, "Formation of Optical Elements by Holography," 8–1967, IBM Tech. Disclosure Bull., pp. 267–268

*Primary Examiner*—Norman G. Torchin
*Assistant Examiner*—Edward C. Kimlin
*Attorney*—Michael S. Striker

[57] ABSTRACT

Lenticular optical elements are produced by exposing selected areas of a layer of photosensitive material to light whose intensity varies in accordance with a predetermined pattern. The thus exposed layer is thereupon stabilized by developing or rehalogenating.

7 Claims, 5 Drawing Figures

PATENTED NOV 27 1973 3,775,110

INVENTOR.
FRIEDRICH BESTENREINER
BY REINHOLD DEML

METHOD FOR THE PRODUCTION OF LENTICULAR ELEMENTS

BACKGROUND OF THE INVENTION

The present invention relates to a method and apparatus for the production of lenticular optical elements.

Hitherto, lenticular elements have been produced by hot-forming of synthetic thermal material, such as by stamping, liquid molding, and die-casting. The main difficulty encountered with these conventional methods is the production of the master form which, as regards its precision, has to meet all the requirements for the quality of the discrete lenses.

The production of such a master form is even more difficult when a plurality of lenses have to be contained in a unit area. The expenses involved with the production of such a master form are excessive when the size of the discrete lenses has to correspond with the dimension of an image point, as is the case with many modern lenticular lenses.

SUMMARY OF THE INVENTION

The object of the invention is to provide a method and an apparatus for the production of lenticular optical elements which enables the precise production of extremely delicate lenticular lenses and which can be resorted to in mass-production of such parts.

The method of making a lenticular optical element according to the present invention comprises the exposure of selected areas of a layer of photosensitive material to light whose intensity varies in accordance with a predetermined pattern and stabilizing the thus exposed layer.

Exposing the layer includes moving the layer relative to the light source or vice versa at a constant speed or at a periodically varying speed and a. directing light to the layer through at least one confined area and periodically varying the intensity of light, or b. directing light to the layer through at least one confined area and maintaining the intensity of light at a constant value, or c. directing light to the layer through a plurality of confined areas whose mutual distance is a whole multiple of a predetermined unit distance, or d. directing light to the layer which light forms two groups of lines, the lines of one group being normal to the lines of the other group and defining therewith square interstices.

Stabilizing the layer includes developing the layer, rehalogenating the layer or developing the layer to impact thereto a grained profile.

The above and other objects, features and advantages of the present invention will become apparent from the following description when taken in connection with the accompanying drawing which shows, for purposes of illustration only, embodiments in accordance with the present invention.

DESCRIPTION OF THE PREFERRED EMBODIMENTS

Figure 1:
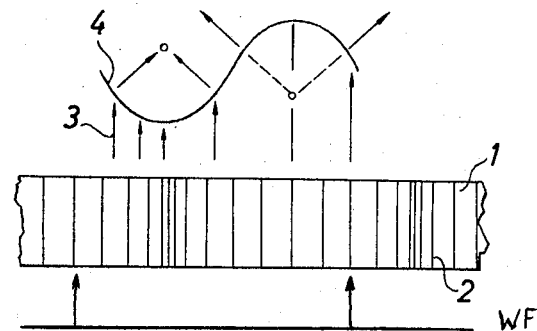
FIG. 1 illustrates the principle of deformation of a wave front passing through a layer of photosensitive material in accordance with the present invention.

FIG. 1 shows a section through a contrast free transparent layer 1 having uniform transparency in all parts thereof. As shown, the layer 1 comprises parallel lines 2 which extend at right angles thereto and are unequally spaced relative to one another to thereby form zones of different line density in the layer whereby the optical path length is determined based on the local refraction index or the respective space variations of the lines 2. Impinging on the lower surface of layer 1 and passing therethrough is an optically flat wave front WF. Part of this front which passes through the zone with a light line density is more delayed than that of the wave front which passes through the zone with a lower line density as a result of a higher refraction index of the highly densed zone. Consequently, and as indicated by arrow 3, the wave train 4 formed beyond the layer 1 is no longer optically flat but sinusoidal and, as shown, within a given distance from the layer, a real focussing is obtained in the area with a higher refractive index, which corresponds to the convex region of a lens, while a virtual focussing occurs in the area with an optically lower refractive index.

Figure 2:
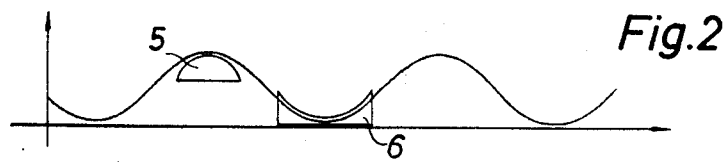
FIG. 2 shows an optically equivalent lenticular element in conventional form.

FIG. 2 illustrates lens configurations which at a continuously constant refractive index realize an optically constant effect. The optically higher refractive zones correspond to diverging lenses 6. Premise for such an analogy of cylindrical or spherical lenses is that the path length relief is a periodical, throughout differentiable function of a local coordinate.

Such lenticular elements can now be produced by exposing a suitable emulsion carrier with a very high dissolution to the superimposed image of two coherent rays. Such a double-ray interference pattern fundamentally has an intensity incidence perpendicular to the strip direction, expressed by $C \cdot (1 + \cos 2\pi Lx)$, in which C is a constant, L the local frequency (for example, the lines per millimeter) and $x$ the local coordinate. For the production of double-ray interference patterns, a biprism may, for example, be placed in the path of a source of monochromatic light while in the overlapping area of the two coherent rays the emulsion carrier is placed on a transport device operative to transport the carrier between exposure intervals transverse to the strip direction. Depending on the gradation pattern of the photographic layer and the subsequent chemical stabilizing or after-treatment, this function can now, distorted or undistorted, be reproduced as a variation of the optical path length. In order to obtain various intensity distributions, the periodic functions may also be determined on the basis of a Fourier analysis, superpositioning of which periodic functions produces the desired intensity distribution.

Further, a lenticular element of spherical lenses may be produced by double exposure of an emulsion carrier with simple line gratings which are displaced at 90° relative to one another. If these simple line gratings have uneven intervals, it will be directly possible to produce lenticular elements which have the effect of torical lenses.

Figure 3:
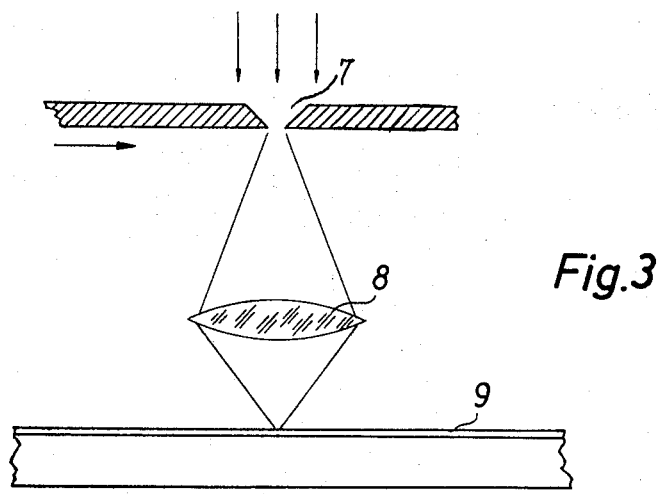
FIG. 3 shows a fundamental arrangement for the exposure of lenticular optical elements.

An apparatus for the exposure of photographic lenticular elements according to the invention is shown in FIG. 3. An aperture 7 is uniformly subjected to a light source, not shown. Aperture 7 is projected by an objective 8 on an emulsion carrier 9. Aperture 7 is shiftable relative to the emulsion carrier 9 with a periodically variable speed so that the quantity of light striking the emulsion carrier is therefore a periodic function of the local coordinate. The possibility further exists to periodically vary the intensity of light and of the slit image by means of a lamp, for example an inertialess lamp, such as a Xenon lamp with suitable light intensity controls. The impulse form and frequency of such a lamp may be varied by means of a suitable generator.

Figure 4:
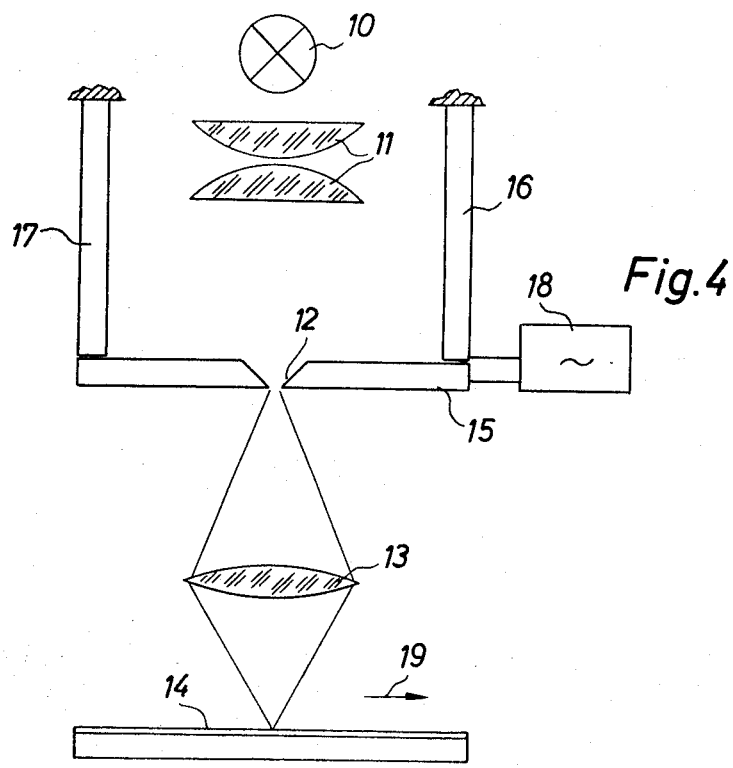
FIG. 4 shows an alternative arrangement for the exposure of lenticular optical elements.
Figure 5:
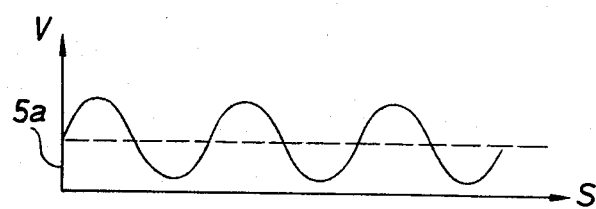
FIG. 5 shows a diagram of the relative speed and exposure intensity of an arrangement as shown in FIG. 4.
Figure 5:
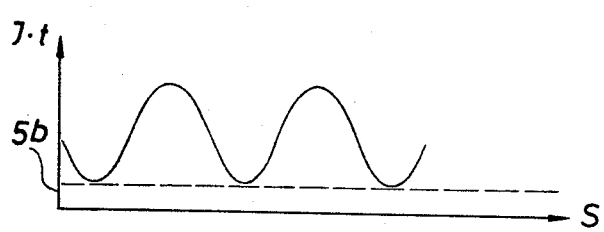

An alternative arrangement to produce a lenticular element according to the invention is shown in FIGS. 4 and 5. An aperture 12 is subjected to light from a lamp 10 via condenser lenses 11 and is projected on an emulsion carrier 14 by means of an objective 13. A plate 15 comprising the aperture 12 is swingably arranged in the plane of the plate, perpendicularly to the aperture direction, and is connected to flexible supports 16 and 17. An oscillation generator 18 transmits an actuating frequency to the plate 15. The emulsion carrier 14 is continuously shiftable in the direction of the arrow 19 and to this end is, for example, placed on a slidable carriage, not shown. If, with the arrangement of FIG. 4, the speed of the emulsion carrier 14 is such that it corresponds with the maximum speed of the oscillating plate 15, which oscillates with a constant frequency and amplitude, a relative speed is obtained between the aperture image and the emulsion carrier 14, which speed periodically varies between zero and twice the maximum speed of the plate 15. As a result, a light quantity I · t results, graphically shown in FIG. 5b, which strikes the emulsion carrier and which periodically varies between a minimum and a maximum value. The minimum value results when the relative speed has its maximum value while the maximum value is obtained when the image of the aperture temporarily has the same speed and direction as the emulsion carrier. The duration of presence of the slit image on the emulsion carrier then has its maximum value.

The minimum quantity of the light which strikes the emulsion carrier does not influence the efficiency of the lenticular elements, this in view of the fact that only the contrast, that is the difference between the maximum and minimum value, is of importance.

Instead of a single aperture, more apertures may also be arranged per unit area and in integral multiples thereof so as to shorten the exposure of a larger surface.

However, the number of lenticular elements produced as described hereinbefore, may also be multiplied by galvanically molding the outer relief, which defines the volume deformation of the layer. Such a galvanically produced form may thereafter be used for the deformation of, for example, plastic resins in order to manufacture or rather produce screens with the same profile.

The required chemical steps for the production of lenticular elements such as development, rehalogenating, bleaching, and other after treatments are generally known and consequently are not further described.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A method of producing a lenticular, geometric optical raster element which comprises the steps of forming a ray of coherent light; splitting said ray into a plurality of rays; deflecting and overlapping said plurality of rays to form an interference pattern; exposing selected areas of a layer of photosensitive material to said interference pattern, wherein said exposing step comprises periodically varying the intensity of light; and stabilizing said layer.

2. A method according to claim 1, wherein said stabilizing step comprises developing said layer.

3. A method according to claim 2, wherein said stabilizing step comprises rehalogenating said layer.

4. A method according to claim 3, wherein said stabilizing step comprises developing said layer to impart thereto a grained profile.

5. A method according to claim 1, wherein said lenticular optical element is cylindrical, and wherein the light to which the layer is exposed forms a pattern of substantially parallel and at least substantially equidistant, similar lines.

6. A method according to claim 1, wherein said pattern is an interference pattern resulting from the superposition of a number of double-ray interference patterns.

7. A method according to claim 6, wherein said double-ray interference patterns have different local frequencies.

* * * * *